United States Patent
Winter

(10) Patent No.: US 8,953,782 B2
(45) Date of Patent: Feb. 10, 2015

(54) CRYPTO ARRANGEMENT WITH MIXED ENDIAN

(75) Inventor: Guy M. Winter, Glen Rock, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 141 days.

(21) Appl. No.: 13/467,685

(22) Filed: May 9, 2012

(65) Prior Publication Data

US 2012/0288087 A1 Nov. 15, 2012

Related U.S. Application Data

(60) Provisional application No. 61/483,973, filed on May 9, 2011.

(51) Int. Cl.
*H04K 1/00* (2006.01)

(52) U.S. Cl.
USPC ........................................................... 380/28

(58) Field of Classification Search
USPC .................................. 726/2; 713/161; 380/28
See application file for complete search history.

(56) References Cited

U.S. PATENT DOCUMENTS

| | | | |
|---|---|---|---|
| 6,341,345 B1 | 1/2002 | Auslander et al. | |
| 6,772,320 B1 | 8/2004 | Raj | |
| 7,203,636 B2 | 4/2007 | Sandham | |
| 7,334,066 B2 | 2/2008 | Lee | |
| 7,721,077 B2 | 5/2010 | Rajaram | |
| 7,835,523 B1 | 11/2010 | Mickelson et al. | |
| 7,966,432 B2 | 6/2011 | Fulcheri et al. | |
| 8,095,776 B2 | 1/2012 | Sakamaki et al. | |
| 2007/0130570 A1* | 6/2007 | Paniscotti et al. | 719/311 |
| 2008/0046615 A1* | 2/2008 | Lee | 710/65 |

* cited by examiner

*Primary Examiner* — Anthony Brown
(74) *Attorney, Agent, or Firm* — Leo Zucker; Daniel J. Long

(57) ABSTRACT

A method of sending or marshaling data from a device through a cryptographic unit in a software communications architecture (SCA), includes identifying an endian mode of the cryptographic unit, and determining if the data to be sent from the device has an endian mode that matches the endian mode of the cryptographic unit. If the endian modes match, the data is enabled to be sent through the cryptographic unit. If the endian modes do not match, the endian mode of the data is flipped and then the data is then enabled to be sent through the cryptographic unit.

1 Claim, 1 Drawing Sheet

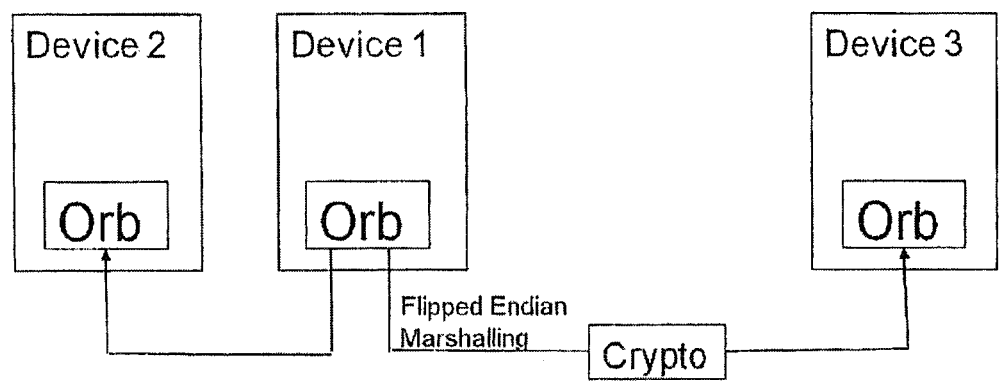

CRYPTO ARRANGEMENT WITH MIXED ENDIAN

CROSS REFERENCE TO RELATED APPLICATION

This application claims priority under 35 U.S.C. Sec. 119 (e) of U.S. Provisional Patent Application No. 61/483,973 filed May 9, 2011, titled Mixed Endian and incorporated herein by reference in its entirety.

BACKGROUND OF THE INVENTION

1. Field of the Invention

The present invention relates to software defined radio systems, and particularly to sending data through cryptographic units employed in such systems.

2. Discussion of the Known Art

In a Joint Tactical Radio System (JTRS) standard known as the Software Communications Architecture (SCA), different data processors and other devices marshal or send to one another by use of a middleware common object request broker architecture, or CORBA. A so-called CORBA Orb software library provides standard procedures that enable dissimilar devices to communicate with one another. When exchanging data between dissimilar devices, the format in which bytes of the data are organized or transmitted is an important issue. If the most significant byte of the data is transmitted first, the format is called Big Endian. If the least significant byte is transmitted first, the format is called Little Endian.

Problems may arise if two devices in a SCA compliant radio use different endian formats but need to exchange data. In such a case, the data must be reformatted before it can be processed at the destination device. In the SCA, there is a standardized field that allows data to be marked to indicate whether it is in big endian or in little endian format. It is then the responsibility of processors at the destination device to reformat the received data, if necessary, before processing it. In the current procedure, the device sending the data always does so in its native endian mode.

Moreover, two devices may at times need to send data through a cryptographic unit that can accept only one of the two endian formats. Data that is marked as being in the other format is simply not accepted, thereby blocking communications between the devices on either side of the cryptographic unit. Since the SCA protocols require the destination device to change the endian format of received data if necessary, and not the data sending device, data that is not in the format accepted by the cryptographic unit can not be passed to a device on the other side of the unit, even if the data itself is not encrypted.

U.S. Pat. No. 6,341,345 (Jan. 22, 2002) describes modifications to a computer architecture to handle mixed endian data and code. The data and code are contained in memory blocks controlled by a memory management unit (MMU). Page descriptors in the MMU contain a bit indicating whether the page is to be accessed as little or big endian.

U.S. Pat. No. 6,772,320 (Aug. 3, 2004) relates to data sharing between mixed endian processors in a subnet management packet (SMP) environment via shared memory, and the requisite data structures needed by an SMP system to share mixed endian data. The patent does not apply to non-SMP systems, however.

U.S. Pat. No. 8,095,776 (Jan. 10, 2012) relates to a semiconductor device that can be used to transfer data in either little or big endian mode. The patent does otherwise address the matter of incompatibility between a standard CORBA and an encryption engine that lacks the patented device.

U.S. Pat. No. 7,203,636 (Apr. 10, 2007) relates to the emulation of a processor of a particular endianness (big or little) by a processor of the other endianness (little or big). The patent is not directed to network data transfer or with byte and bit order of data on a network channel. Rather, the patent concerns processor emulation and data addressing in memory.

U.S. Pat. No. 7,334,066 deals with the possibility of having big and little endian devices on a bus such as a PCI bus. While common practice does not allow placing big endian data on a PCI bus, the big endianness would be documented so that device driver writers would take this into account.

U.S. Pat. No. 7,721,077 (May 18, 2010) relates to an architectural feature of a computer that supports an endian conversion register inside the CPU register space. The intent is that a conversion between endianness would be transparently supported by compiler generated instructions, and U.S. Pat. No. 7,966,432 (Jun. 21, 2011) is also a hardware related patent. U.S. Pat. No. 7,835,523 relates to an abstraction layer for an encryption device, but does not address the byte order of data.

Notwithstanding the known art, a need exists for a technique by which data in either a big or a little endian format can pass through a cryptographic unit that only accepts data in one of the two formats.

SUMMARY OF THE INVENTION

According to the invention, a method of sending or marshaling data from a device through a cryptographic unit in a software communications architecture (SCA), includes identifying an endian mode of the cryptographic unit, determining if the endian mode of the data matches the endian mode of the cryptographic unit, and, if the endian modes match, enabling the data to be sent through the cryptographic unit, and, if the endian modes do not match, first flipping the endian mode of the data and then enabling the data to be sent through the cryptographic unit.

All normal SCA formats and functions may otherwise be preserved.

For a better understanding of the invention, reference is made to the following description taken in conjunction with the accompanying drawing and the appended claims.

BRIEF DESCRIPTION OF THE DRAWING

In the drawing:

The sole FIGURE is a schematic block diagram showing devices arranged for sending data through a cryptographic unit in a software communications architecture (SCA) compliant radio, according to the invention.

DETAILED DESCRIPTION OF THE INVENTION

The drawing illustrates in block form three devices, viz., Device 1, Device 2, and Device 3, within a software communications architecture (SCA) compliant radio. The radio also employs a cryptographic (Crypto) unit for encrypting messages or data that originate from Device 1 and is destined to Device 3. When the devices need to communicate with one another, the devices follow the CORBA protocol but with the following modification according to the invention.

The endian mode of the Crypto is identified in the CORBA Orb for the devices. Device 2 monitors the endian mode that Device 1 will use when Device 1 desires to send data to Device 3 through the Crypto. If Device 2 determines that the endian mode to be used by Device 1 does not match that of the Crypto, Device 2 signals Device 1 to flip the endian mode before sending the data to Device 3 through the Crypto.

In the event Device 3 is not set to process the received data in the same endian mode as the Crypto, then processors in Device 3 may be configured to reformat the received data before processing it as per the current procedure. Otherwise, all standard SCA formats and functions may be preserved.

It will be understood that the inventive method relates to how messages are handled with respect to their endianness at an interface. The invention provides a message oriented software solution that can be run on any computer, and does not require major changes to a computer's architecture.

While the foregoing represents preferred embodiments of the invention, it will be understood by those skilled in the art that various modifications, additions, and changes may be made without departing from the spirit and scope of the invention, and that the invention includes all such modifications and changes as come within the scope of the following claims.

I claim:

1. A method of marshaling data to be sent from a first device through a cryptographic unit to a third device under a software communications architecture (SCA) standard having a common object request broker architecture (CORBA), including:

providing a cryptographic unit having one of a big endian or a little endian mode;

identifying the endian mode of the cryptographic unit as either big endian or little endian in a software library of the CORBA (CORBA ORB);

providing a first device from which data is to be sent through the cryptographic unit to a third device, and configuring the first device for changing the endian format of the data to be sent from the first device between a selected one of a big endian and a little endian format;

providing and configuring a second device for (i) monitoring a present endian format to be used by the first device for the data to be sent through the cryptographic unit to the third device, (ii) determining if the present endian format to be used by the first device corresponds to the endian mode of the cryptographic unit identified in the CORBA ORB, and (iii) changing the present endian format to be used by the first device for the data to be sent through the cryptographic unit if the present endian format does not correspond to the endian mode of the cryptographic unit;

if the second device determines that the present endian format of the data to be sent from the first device corresponds to the endian mode of the cryptographic unit, then allowing the data from the first device to be sent through the cryptographic unit to the third device;

if the second device determines that the present endian format of the data to be sent from the first device does not correspond to the endian mode of the cryptographic unit, first changing the endian format of the data to be sent from the first device to correspond to the endian mode of the cryptographic unit, and then allowing the data from the first device to be sent through the cryptographic unit to the third device; and configuring the third device to reformat the data received from the cryptographic unit before processing the data if the third device is not presently set to process data in a format that corresponds to the endian mode of the cryptographic unit.

\* \* \* \* \*